United States Patent
Kellner

(10) Patent No.: US 10,057,637 B2
(45) Date of Patent: Aug. 21, 2018

(54) REAL-TIME CONTENT FILTERING AND REPLACEMENT

(71) Applicant: Autodesk, Inc., San Rafael, CA (US)

(72) Inventor: Hans Kellner, Oakland, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 15/664,870

(22) Filed: Jul. 31, 2017

(65) Prior Publication Data
US 2017/0332137 A1 Nov. 16, 2017

Related U.S. Application Data

(62) Division of application No. 14/744,768, filed on Jun. 19, 2015, now abandoned.

(51) Int. Cl.
*H04N 21/44* (2011.01)
*H04N 21/81* (2011.01)
(Continued)

(52) U.S. Cl.
CPC ... *H04N 21/44008* (2013.01); *G06K 9/00711* (2013.01); *H04N 21/4532* (2013.01); *H04N 21/45452* (2013.01); *H04N 21/812* (2013.01)

(58) Field of Classification Search
CPC ....... H04N 21/23412; H04N 21/23418; H04N 21/23424; H04N 21/236; H04N 21/25883; H04N 21/25891; H04N 21/431; H04N 21/4312; H04N 21/4316; H04N 21/4408; H04N 21/4532; H04N 21/45452; H04N 21/47205; H04N 21/4725; H04N 21/812; H04N 21/84; H04N 21/854;
(Continued)

(56) References Cited

U.S. PATENT DOCUMENTS

2003/0050864 A1* 3/2003 Trajkovic ............... G06Q 30/02
705/26.35
2010/0122286 A1 5/2010 Begeja et al.
(Continued)

OTHER PUBLICATIONS

Unknown Author, "Adblock Plus—Surf web without annoying ads.!," 1 page, Jun. 17, 2015, retrieved from Internet Archive Wayback Machine https://web-beta.archive.org/web/20150617204010/https://adblockplus.org/ on Feb. 13, 2017.

*Primary Examiner* — Hai V Tran
(74) *Attorney, Agent, or Firm* — Fish & Richardson P.C.

(57) ABSTRACT

Methods, systems, and apparatus include computer programs encoded on a computer-readable storage medium, including a method for augmenting video streams, includes processing a video stream prior to presentation to identify objects to be selectively augmented in the video stream. The method includes: receiving and storing a first user selection of a preference for one or more aesthetic attributes to be associated with the first user and to be projected to a second user; receiving, at a second different device not associated with the first user, the preference for the one or more aesthetic attributes; identifying, at the second different device, image data associated with the first user and selectively augmenting the identified image data using the one or more aesthetic attributes; and presenting, on the second different device, the identified image data that is augmented by the one or more aesthetic attributes.

20 Claims, 5 Drawing Sheets

(51) Int. Cl.
*H04N 21/4545* (2011.01)
*H04N 21/45* (2011.01)
*G06K 9/00* (2006.01)

(58) Field of Classification Search
CPC ........... H04N 21/8583; G06Q 30/0251; G06Q 30/0269; G06Q 30/0271; G06K 9/00711
See application file for complete search history.

(56) References Cited

U.S. PATENT DOCUMENTS

| | | |
|---|---|---|
| 2010/0146607 A1 | 6/2010 | Piepenbrink et al. |
| 2011/0321086 A1 | 12/2011 | Buchheit et al. |
| 2012/0218423 A1* | 8/2012 | Smith .................... G06Q 30/02 348/207.1 |
| 2013/0046637 A1* | 2/2013 | Slutsky .............. G06Q 30/0269 705/14.66 |
| 2016/0012859 A1 | 1/2016 | Harader et al. |
| 2016/0117749 A1* | 4/2016 | Desmarais ............. A41H 3/007 382/111 |
| 2016/0212455 A1 | 7/2016 | Manna |
| 2016/0373814 A1 | 12/2016 | Kellner |

* cited by examiner

300

```
┌─────────────────────────────────────────────────────────────────────┐
│ Receive, at a first device, a first user selection of a preference │
│ for one or more aesthetic attributes to be associated with the      │
│ first user and for projection to other second users that are        │
│ capable of viewing either the first user or an object               │
│ associated with the first user                                  302 │
└─────────────────────────────────────────────────────────────────────┘
                                    │
                                    ▼
┌─────────────────────────────────────────────────────────────────────┐
│ Receive, at a second different device not associated with the       │
│ first user, the projected one or more aesthetic attributes      304 │
└─────────────────────────────────────────────────────────────────────┘
                                    │
                                    ▼
┌─────────────────────────────────────────────────────────────────────┐
│ Identify, at the second different device, image data associated    │
│ with the first user and selectively augment the image data using   │
│ the received one or more aesthetic attributes                  306 │
└─────────────────────────────────────────────────────────────────────┘
                                    │
                                    ▼
┌─────────────────────────────────────────────────────────────────────┐
│ Present, on the second different device, the image data that is    │
│ augmented by the one or more aesthetic attributes              308 │
└─────────────────────────────────────────────────────────────────────┘
```

```
┌─────────────────────────────────────────────────────────────────────┐
│ At a first device, receive a first user selection of a preference    │
│ for one or more aesthetic attributes to be associated with the first │
│ user, and store the one or more aesthetic attributes            402  │
└─────────────────────────────────────────────────────────────────────┘
                                  ↓
┌─────────────────────────────────────────────────────────────────────┐
│              Capture an image of the design                    404  │
└─────────────────────────────────────────────────────────────────────┘
                                  ↓
┌─────────────────────────────────────────────────────────────────────┐
│              Evaluate the preference                           406  │
└─────────────────────────────────────────────────────────────────────┘
                                  ↓
┌─────────────────────────────────────────────────────────────────────┐
│ Selectively augment the image using the one or more aesthetic       │
│ attributes, and presenting, on the first device, image data that is │
│ augmented by the one or more aesthetic attributes              408  │
└─────────────────────────────────────────────────────────────────────┘
```

FIG. 4

REAL-TIME CONTENT FILTERING AND REPLACEMENT

CROSS-REFERENCE TO RELATED APPLICATIONS

This application is a divisional application of, and claims priority to, U.S. patent application Ser. No. 14/744,768, entitled REAL-TIME CONTENT FILTERING AND REPLACEMENT, which was filed on Jun. 19, 2015, and which published on Dec. 22, 2016, as U.S. Patent Publication No. US-2016-0373814-A1.

BACKGROUND

This specification relates to the presentation of content.

Users can be presented with various types of content, such as text, images and video that are included in web pages or other on-line resources. Not all users like to see all types of content, and users may often ignore content which is of no interest to them personally. Different users may not all be interested in the same subjects, products, or different format or types of content. Further, when browsing the web, the content that users see may vary, for example, depending on whether a user is using a mobile device or a non-mobile device.

SUMMARY

In general, aspects of the invention are directed to methods, systems, computer program products and apparatus. A computer-implemented method includes receiving a video stream and prior to presenting the video stream on a device to an end user, processing the video stream and identifying one or more objects to be replaced in the video stream including. Processing includes identifying a profile associated with the end user that is to view the video stream, determining one or more preferences of the end user regarding subject matter embodied in objects that preferably be included or excluded from video presented to the end user, determining, based on the one or more preferences, whether the video stream includes first objects that embody subject matter that preferably should be excluded from presentation to the end user, and determining when the end user has indicated a replacement preference for replacement content and when so, inserting the replacement content at a location in the video stream associated with the first objects producing an updated video stream. The method further includes determining when the end user has indicated an alteration preference for altering content and when so, altering the first objects in accordance with the alteration preference producing the updated video stream and providing the updated video stream to the end user.

Aspects of the method can include one or more of the following features. Determining whether the video stream includes the first objects can include evaluating metadata for the video to locate objects of interest. Determining whether the video stream includes the first objects can include buffering the video stream, evaluating individual frames of the video stream included in the buffer, locating the first objects, and replacing or altering the first objects in accordance with the replacement and alteration preferences. The first objects can include ad slots and wherein evaluating individual frames includes locating ad slots in individual frames and replacing or altering content included in a located ad slot based on the replacement and alteration preferences. The first objects can be related to a first subject matter and wherein determining whether the video stream includes the first objects includes evaluating individual frames of the video stream, locating features in a respective video frame, evaluating the features to determine when the features are associated with the subject matter and altering or replacing features in accordance with the alteration and replacement preferences. Determining whether the video stream includes first objects can include determining whether a frame of the video includes a product, and when so, replacing or altering a portion of the frame to exclude or alter presentation of the product based on the alteration and replacement preferences. Determining whether the video stream can include first objects includes determining whether each frame in the video stream includes an advertisement and when so, replacing or altering a portion of the frame that includes the advertisement in accordance with the alteration and replacement preferences.

In another aspect, a computer-implemented method for enabling end users to project aesthetics associated with a design is provided and includes receiving, at a first device, a first user selection of a preference for one or more aesthetic attributes to be associated with the first user and for projection to other second users that are capable of viewing either the first user or an object associated with the first user. The method further includes receiving, at a second different device not associated with the first user, the projected one or more aesthetic attributes, identifying, at the second different device, image data associated with the first user and selectively augmenting the image data using the received one or more aesthetic attributes and presenting, on the second different device, the image data that is augmented by the one or more aesthetic attributes.

The one or more aesthetic attributes can be attributes associated with clothes the first user is wearing, wherein the image data is an image of the first user as viewed by the second different device, and wherein augmenting the image data includes superimposing over or embellishing on clothes worn by the first user such that the aesthetic attributes appear to be worn by the first user. The one or more aesthetic attributes constitute an outfit, appearance, or look that the first user has opted to project, and wherein augmenting the image data includes augmenting the image of the first user to apply the outfit, appearance or look to the first user when viewed through the second viewer device. Identifying image data can include capturing image data associated with the first user using a camera included in the second different device, and wherein augmenting the image data includes augmenting a captured image. The method can include capturing an image of a scene that includes the first user, recognizing the first user in the captured scene, and augmenting a portion of the image of the captured scene that includes the first user to apply an outfit to the first user. The method can include receiving at the second different device one or more additional projected aesthetic attributes associated with other users, recognizing one of the other users in the captured scene, and augmenting a portion of the image of the captured scene that includes the one other user based on respective received projected attributes for the one other user. Selectively augmenting can include selectively controlling when to augment image data including augmenting the image data when a control has been selected by a second user associated with the second different device to enable augmentation and further disabling augmentation when the control has been disabled.

In another aspect, a computer-implemented method for enabling end users to project aesthetics onto a design includes at a first device, receiving a first user selection of a preference for one or more aesthetic attributes to be associated with the first user and storing the one or more aesthetic attributes, capturing an image of the design, evaluating the preference and selectively augmenting the image using the one or more aesthetic attributes and presenting, on the first device, image data that is augmented by the one or more aesthetic attributes.

The one or more aesthetic attributes can be attributes associated with clothes the first user is wearing, wherein the image data is an image of the first user as viewed by the first device, and wherein augmenting the image includes superimposing over or embellishing on clothes worn by the first user such that the aesthetic attributes appear to be worn by the first user. The one or more aesthetic attributes can constitute an outfit, appearance, or look that the first user has opted to project, and wherein augmenting the image data includes augmenting the image of the first user to apply the outfit, appearance or look to the first user when viewed through the first device. Identifying image data can include capturing image data associated with the first user using a camera included in the first device, and wherein augmenting the image data includes augmenting a captured image. The method further includes capturing an image of a scene that includes the first user, recognizing the first user in the captured image, and augmenting a portion of the captured image that includes the first user to apply an outfit to the first user. The method can further comprise receiving, at the first device, one or more additional projected aesthetic attributes associated with other users, recognizing one of the other users in the captured image, and augmenting a portion of the captured image that includes the one other user based on respective received projected attributes for the one other user. Selectively augmenting can include selectively controlling when to augment image data including augmenting the image data when a control has been selected by a second user associated with the first device to enable augmentation and further disabling augmentation when the control has been disabled.

Particular implementations may realize none, one or more of the following advantages. Users can project and be presented with a virtual environment that provides a different look for different users. Users can control how they appear, virtually, to themselves and to other users. A device, such as your mobile device, can be configured (e.g., with an application) that enables a user to see a scene (e.g., through a camera on the mobile device) that has been augmented. Augmentation can include additions, substitutions and/or deletions of content that would ordinarily be visible with the human eye. Such augmentations can be controlled by the user of the user device or imported/projected to other users (such as other users in a given scene).

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart of an example process for projecting aesthetic attributes in content for a user that is presented to other users.

FIG. 4 is a flowchart of an example process for specifying aesthetic attributes for augmenting content on a user's own device.

Like reference numbers and designations in the various drawings indicate like elements.

DETAILED DESCRIPTION

Systems, methods, and computer program products are described for providing content filtering, augmentation and replacement. For example, a system can analyze a video stream for objects that should be augmented, altered or replaced, and an updated video stream can be provided. In some implementations, user preferences can be used to determine which objects, if any, are to be augmented, altered or replaced. A user can define preferences that indicate, for example, that the user does not want to see advertisements, and an "ad block" type of filter can block the advertisements. Based on user preferences, some content can be replaced with a blank surface or some other rendering preferred by the user. In some implementations, a user can designate aesthetic attributes (e.g., fashion-related) for use in updating content (e.g., images of the user) that is presented to other users. In some implementations, a user can specify aesthetic attributes for augmenting content on a user's own device.

In some implementations, a user's mobile device is enabled (e.g., includes an application that broadcasts using a short range communication protocol) broadcasts or otherwise publishes an outfit, look, or persona including one or more aesthetic attributes for which the individual wants to be associated with at a given instance in time (as viewed or perceived by others). For example, Person A may want to appear professional, e.g., by projecting an expensive suit. Person B, who identifies as a lion, may want to project as a lion. Person C, for example using a computer device with a video stream updating system as described herein, would see Person A wearing the expensive suit and Person B as the lion. The computer stream updating system can be configured track each person in a given scene (as viewed through a camera on a device), for example, and augment that person's image with a virtual outfit. In some implementations, options can be provided by which, for example, Person C can elect to ignore outfits that are broadcast by the system or to override the system with outfits designated by Person C.

In some implementations, aesthetic attributes can be represented and/or designated using unique identifiers (IDs), each ID being associated with a particular aesthetic attribute. For example, unique IDs can be transmitted from device to device (or through a central server), and each unique ID can be used to access a fully encapsulated representation (e.g., without having to store the complete information). The unique IDs can be small and quickly transmitted and used, e.g., to look up or query a service for information needed for that particular user's device. In some implementations, information associated with aesthetic attributes can be purchased, leased, or otherwise controlled by a central service.

Figure 1:
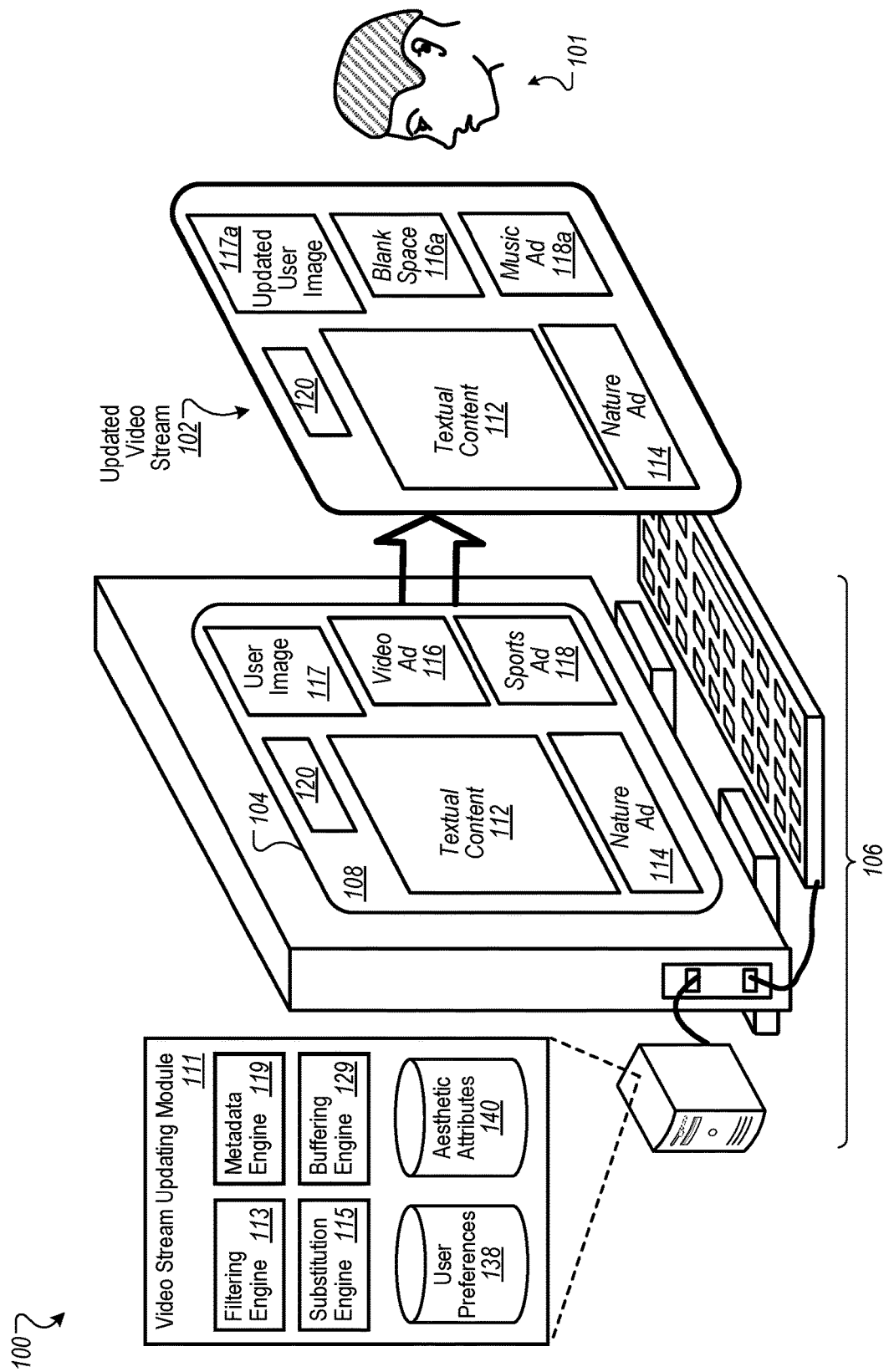
FIG. 1 is a block diagram of an example updated video stream system.

FIG. 1 is a block diagram of an example updated video stream system 100. The updated video stream system 100 (hereafter system 100) can produce an updated video stream 102 that can change some of the content presented to a user 101 of a computer device 106. For example, the updated video stream 102 can replace content (e.g., in a video stream 108) that would otherwise be presented on a screen 104 to the user 101.

In some implementations, user preferences 138 can be defined such that certain types of textual or other types of content, as specified by the user 101, are to be filtered, augmented, replaced or otherwise processed prior to presentation on a given device. A video stream updating module 111, for example, can analyze the video stream 108 for objects that should be altered or replaced.

The video stream updating module 111 can include plural engines. A filtering engine 113, for example, can be used to filter content, e.g., to block certain types of content such as advertisements. A substitution engine 115, for example, can substitute objects in a video stream, e.g., to update, replace or augment the objects. A metadata engine 119, for example, can parse metadata associated with a video stream, e.g., to identify which of the objects in the video stream are to be changed. A buffering engine 129, for example, can buffer content associated with a video stream so as to enable the filtering and substitution engines 113,115 respectively to evaluate individual frames or portions of frames so as to enable the engines to locate and process objects in the video stream prior to presentation to a user.

In some implementations, some or all components of the video stream updating module 111 can be included in the computer device 106. In some implementations, some or all components of the video stream updating module 111 can be external to the computer device 106, e.g., accessible over a network and used to change content provided to the computer device 106. Alternatively, the video stream updating module 111 may be local and configured to operate on image/video data received locally on the device, such as through an on device camera. The network can include, for example, the Internet, a local area network (LAN), a wide area network (WAN), other networks, or combinations thereof. In some implementations, computer devices 106 that include systems and information related to user preferences can communicate with near-field communication (NFC).

In an example of content that can be changed producing an updated video stream 102, a user 101 (e.g., a viewer) may have preferences that indicate that the user 101 does not want to see certain types of content (e.g. advertisements). In some implementations, an "ad block" type of filter (e.g., used by the filtering engine 113) can be used to block advertisements. In some implementations, content recognized as an advertisement can be replaced with a default replacement display, a blank screen, or some other rendering preferred by the user. As a result, the updated video stream 102 can include selected content portions of the video stream 108, some of which may be changed by the system 100.

Although the computer device 106 shown in FIG. 1 is a personal computer (e.g., including a display monitor), computer devices 106 can also include laptop computers, tablets, smart phones, wearables, or other computing devices that, for example, stream content and include a display.

The video stream 108 includes various content items 112-120, some of which can appear unchanged to the user when presented in the updated video stream 102. For example, video ad 116 can be replaced in the updated video stream 102, for example, with a blank space 116a. For example, user preferences 138 may indicate that the user 101 has specified that video ads are not to be presented, or the video ad 116 can be excluded for another user-specified reason.

A user image 117 in the video stream 108 can be adjusted, augmented, or replaced, for example, by an updated user image 117a. For example, updated user images 117a can be selectively augmented images that are updated using one or more aesthetic attributes 140. The user 101 can designate preferences, for example, that are used to change the presentation of an image that includes the user 101. The preferences can indicate, for example, how the image is to be presented to the user 101, and the same or different preferences can indicate how the image is to be presented to other users (e.g., when an image associated with or containing the user 101 is included in a video stream).

A sports-related ad 118, for example, can be replaced by a music ad 118a. The replacement can be made, for example, by the substitution engine 115, based on user preferences 138 that indicate that the user 101 does not want sports-related ads to be presented or conversely only wants music related content.

Some objects may not be updated for use in the updated video stream 102. For example, textual content 112 may appear in the updated video stream 102 as the content would otherwise appear in the video stream 108. A nature ad 114, for example, may appear in the updated video stream 102 as it appears in the video stream 108, e.g., if the user 101 has no preferences or settings to replace or otherwise process nature-related advertisements (or other settings that would cause the presentation to be changed).

Figure 2:
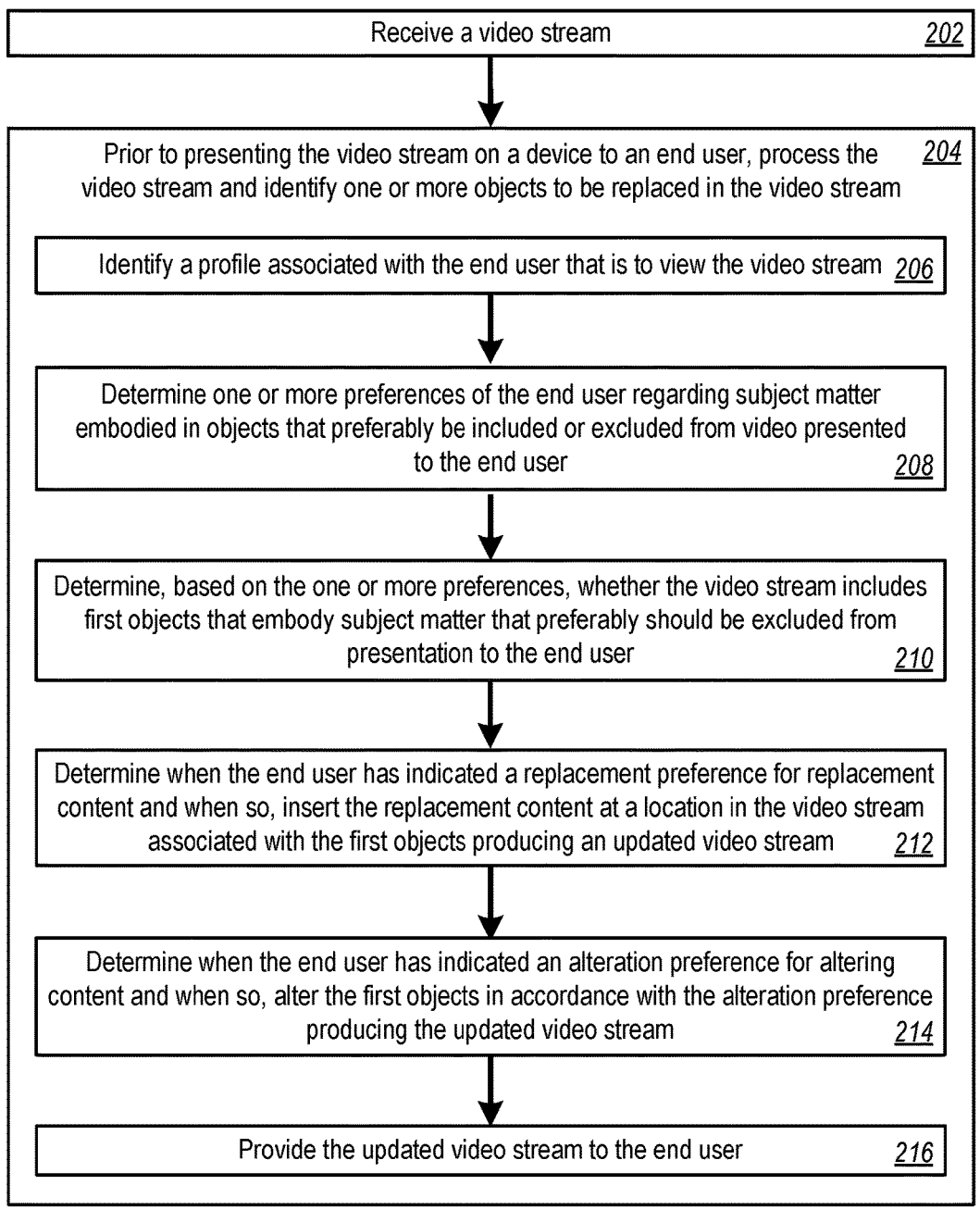
FIG. 2 is a flowchart of an example process for adjusting the presentation of content provided in a video stream.

FIG. 2 is a flowchart of an example process 200 for adjusting the presentation of content provided in a video stream. For example, the process 200 can be used to change or remove advertisements in the video stream. In some implementations, the system 100 can perform steps of the process 200 using instructions that are executed by one or more processors. FIG. 1 is used to provide example structures for performing the steps of the process 200.

A video stream is received (202). For example, the video stream 108 can be received at the computer device 106, e.g., intercepted by or otherwise provided to the video stream updating module 111.

Prior to presenting the video stream on a device to an end user, the video stream is processed and one or more objects to be replaced/augmented or otherwise changed in the video stream are identified (204). For example, the video stream updating module 111 can analyze objects 112-120 in the video stream 108 to determine which, if any, of the objects 112-120 are to be changed for presentation in the updated video stream 102. In some implementations, processing the video stream can be accomplished using the following steps.

A profile associated with the end user that is to view the video stream is identified (206). For example, the video stream updating module 111 can access information in the user preferences 138 that may include profile information for the user 101, including preferences for the user 101 as to how video streams are to be updated.

One or more preferences of the end user are determined regarding subject matter embodied in objects that preferably be included or excluded from video presented to the end user (208). For example, the video stream updating module 111 can identify the types of objects that are to be changed for the user 101.

A determination is made, based on the one or more preferences, whether the video stream includes first objects that embody subject matter that preferably should be changed prior to presentation to the end user (210). For example, the video stream updating module 111 can identify which of the objects 112-120 in the video stream 108 are to be changed, deleted or otherwise processed.

In some implementations, determining whether the video stream includes the first objects can include evaluating metadata for the video to locate objects of interest. As an example, the metadata engine 119 can parse metadata (e.g., titles, tags, embedded names and/or other information) associated with the video stream 108 to identify which of the objects 112-120 in the video stream 108 are to be changed.

In some implementations, determining whether the video stream includes the first objects can include buffering the video stream, evaluating individual frames of the video stream included in the buffer, locating the first objects, and augmenting, replacing or altering the first objects in accordance with one or more of the augmentation, replacement and alteration preferences. For example, the buffering engine 129 can buffer (without displaying to the user) the content associated with the video stream 108. During the buffering, the buffering engine 129 can evaluate individual frames or portions of frames (e.g., cells) and the substitution engine 115 can replace/alter/augment objects 112-120 as needed, based on user preferences 138. As a result, objects 116, 117 and 118 can be replaced, for example, with objects 116a, 117a and 118a, respectively.

In some implementations, the first objects can include ad slots, and evaluating individual frames can include locating ad slots in individual frames and augmenting, replacing or altering content included in a located ad slot based on the augmentation, replacement and/or alteration preferences. For example, the substitution engine 115 can replace frames in the video stream 108 that include the sports-related ad 118 with frames for the music ad 118a.

In some implementations, the first objects are related to a first subject matter, and determining whether the video stream includes the first objects can include evaluating individual frames of the video stream, locating features in a respective video frame, evaluating the features to determine when the features are associated with the subject matter and altering or replacing features in accordance with the alteration and replacement preferences. For example, the user preferences 138 can identify "sports" as a matter for which content is to be changed. The buffering engine 129, for example, can identify sports-related frames in the video stream 108, such as by identifying features in a video that depict or identify football players, race cars, or other sports features. The substitution engine 115 can replace the sports-related frames or portions of frames as needed.

In some implementations, determining whether the video stream includes first objects can include determining whether a frame of the video includes a product, and when so, a portion of the frame can be replaced or altered to augment, exclude or alter presentation of the product based on the augmentation, alteration and replacement preferences. For example, the buffering engine 129 may determine that the video stream 108 includes images of product X, identified either explicitly in the user preferences 138 (or determined implicitly) as being content that is to be replaced.

In some implementations, determining whether the video stream includes first objects can include determining whether a given frame in the video stream includes an advertisement, and when so, determining a portion of the frame can be replaced or altered that includes the advertisement in accordance with the augmentation, alteration and replacement preferences. For example, the video stream updating module 111 can determine when individual frames in the video stream 108 are related to (or indicate) an advertisement. The video stream updating module 111 can then determine, based on user preferences 138, what updates are to occur.

When a determination is made that the end user has indicated a replacement preference for replacement content, the replacement content is inserted at a location in the video stream associated with the first objects, producing an updated video stream (212). For example, content that is replaced or otherwise changed by the substitution engine 115 can appear in the same general location as the original content. As such, objects in the video stream 108 can be replicated (or replaced) in the updated video stream 102 in the same locations. In some implementations, locations used for placement of objects in the updated video stream 102 can be different from the locations of the objects in the video stream 108 and can depend, for example, on user preferences, placement rules, and/or other placement information.

When a determination is made that the end user has indicated an alteration preference for altering content, the first objects are altered in accordance with the alteration preference producing the updated video stream (214). For example, the updated video stream 102 is presented for the user 101 as a replacement to the video stream 108. Examples of alterations can include obfuscations, overlays with other content, blurring, or other image processing techniques.

The updated video stream is provided to the end user (216). The updated video stream 102, for example, is presented on the computer device 106, such as in the screen 104.

In some implementations, other factors can be used by the user 101 to specify and/or categorize user preferences 138. For example, users 101 can specify user preferences that vary based on user location, device type (e.g., mobile or non-mobile), time of day, day of the week, and/or other factors. User preferences can also be used, for example, to block certain types of ads or other content in certain circumstances, e.g., when the user is on a video sharing site or a social networking site, visiting particular domains, viewing certain types of content (e.g., banner ads, video ads, popup/interstitial ads), or in other situations.

In some implementations, when a video stream is updated, elements of the updated video stream that are affected can be annotated or otherwise augmented in some way. For example, the objects 116a, 117a and 118a can include annotated borders or other markings to differentiate the objects from unchanged objects (e.g., objects 112, 114, 120). Other annotations or augmentations are possible.

In some implementations, user controls can be included in an application executing on a device that controls or otherwise executes the filtering, alteration, and augmentation processes described above. The controls can allow the user 101 to selectively control when updated video streams are to be provided (e.g., enabled). For example, using a suspend control, the user 101 can temporarily suspend the generation of updated video streams (e.g., resulting in a native camera output being displayed on an associated user device). A resume control, for example, can be used to resume the generation of updated video streams.

FIG. 3 is a flowchart of an example process 300 for projecting and or viewing aesthetic attributes with content. For example, a user can elect to project certain aesthetics so that other users get an augmented (e.g., not native) view when viewing images that include the user. Similarly, a user can apply certain aesthetics to content that is presented on a device to oneself. In some implementations, the system 100 can perform steps of the process 300 using instructions that are executed by one or more processors. FIG. 1 is used to provide example structures for performing the steps of the process 300.

At a first device, a first user selection is received of a preference for one or more aesthetic attributes to be associated with the first user and for projection to the user or other second users that are capable of viewing either the first user or an object associated with the first user (302). For example, using the computer device 106 and an interface to the video stream updating module 111, the user 101 (e.g., Alice) can input or designate preferences as to how images containing the user 101 are to be presented to other users. In some implementations, the aesthetic attributes can be stored as aesthetic attributes 140, e.g., available across the network to plural computer devices 106 of other users (e.g., Bob, Chuck). The aesthetic preferences can designate, for example, that Alice prefers to appear in designer outfits, even when wearing casual wear.

At a second different device not associated with the first user, the projected one or more aesthetic attributes (or designators for same) are received (304). For example, at a computer device different from the computer device 106 and used by a different user (e.g., Bob), the video stream updating module 111 can receive and access the aesthetic attributes 140 to be attributable to a first user (Alice).

Image data associated with the first user is identified (e.g., at the second different device), and the image data is selectively augmented, altered or otherwise processed using the received one or more aesthetic attributes (306). The video stream updating module 111, for example, can determine that the video stream 108 includes one or more images of the user 101 (e.g., Alice), and the substitution engine 115 can update the image(s) based on the aesthetic attributes 140. For example, the image of Alice can be updated to make the image appear to show Alice wearing designer clothes (e.g., as opposed to casual wear).

The image data that is augmented, altered or otherwise processed in accordance with the one or more aesthetic attributes is presented, for example, on the second different device (308). For example, the updated video stream 102 can be presented on the computer device 106 of the other user. As a result, Bob can be presented with an image of Alice wearing designer clothes.

In some implementations, the one or more aesthetic attributes are attributes associated with clothes the first user is wearing, and the image data can be an image of the first user as viewed by the second different device. Augmenting the image data can include superimposing over or embellishing on clothes worn by the first user such that the aesthetic attributes appear to be worn by the first user. For example, the video stream updating module 111 can change the video stream 108, to make Alice appear to be wearing designer clothes, as described above. Changing the video stream 108, for example, can include superimposing predetermined images of designer clothes onto the image or Alice, or modifying the image in some other way, such as by filling in regions of the image with colors and/or patterns that resemble or approximate designer patterns.

In some implementations, the one or more aesthetic attributes can constitute an outfit, appearance, persona or look that the first user has opted to project, and augmenting the image data can include augmenting the image of the first user to apply the outfit, appearance, persona or look to the first user when viewed through the second viewer device. For example, the aesthetic attributes 140 specified by Alice can be clothing-related, appearance-related (e.g., to make Alice look taller), or emotion-related (e.g., to make Alice look happy, intelligent, or have other qualities). The substitution engine 115, for example, can change the image(s) of Alice to project the outfit, appearance, or look specified by Alice.

In some implementations, identifying image data can include capturing image data associated with the first user using a camera included in the second different device, and augmenting the image data can include augmenting a captured image. For example, the computer device 106 can be a camera-equipped mobile device. Upon capturing an image of Alice, the example, the camera can display an augmented image of Alice, according to the one or more aesthetic attributes.

In some implementations, selectively augmenting can include selectively controlling when to augment image data including augmenting the image data when a control has been selected by a second user associated with the second different device to enable augmentation and further disabling augmentation when the control has been disabled. For example, a control accessible on Bob's computer device 106 (or anyone else's), when selected, can indicate that images are not augmented. As such, Alice will appear as Alice (or an augmented version of Alice) whenever Bob enables (or disables) controls for enabling augmentation.

In some implementations, the process 400 can further include capturing an image of a scene that includes the first user, recognizing the first user in the captured scene, and augmenting a portion of the image of the captured scene that includes the first user to apply a change or other augmentation (e.g., an outfit) to the first user. For example, Bob can use his camera to take a photo of Alice or view her through the lens of the camera. The video stream updating module 111 can use image recognition techniques to determine that the image includes Alice. The video stream updating module 111 can then augment the image of Alice, e.g., using the one or more aesthetic attributes.

In some implementations, the process 400 can further include receiving at the second different device one or more additional projected aesthetic attributes associated with other users, recognizing one of the other users in the captured scene, and augmenting a portion of the image of the captured scene that includes the one other user based on respective received or identified projected attributes for the one other user. For example, Bob can also specify one or more aesthetic attributes that are to be applied to other people in addition to Alice. When Bob takes a photo that includes the other people, for example, the one or more aesthetic attributes can be applied to the images of the other people by the video stream updating module 111.

In an example scenario using at least the process 400, consider Person A (e.g., Alex) and Person B (e.g., Bailey), each using the technology on their computer devices 106. Alex arises in the morning and begins to decide which "outfit" should be projected for the day. Alex can see, e.g., in a mirror, what physical outfit is currently being worn. If Alex is unsatisfied with the look of the outfit, Alex can scan a digital catalog for outfits (e.g., owned or leased), from which clothing and accessories can be selected. Alex can designate changes to his current or selected outfit, e.g., to replace out-of-fashion articles of clothing or to change styles. To do this, Alex can preview, for example, a pair of shoes. If the shoes look attractive, Alex can elect to "purchase" (e.g., virtually) the shoes, e.g., granting Alex the right to project the shoes for a pre-determined time. The purchase can also cause a unique ID associated with the shoes (and other information, including authentication information) to be stored in Alex's computer device, stored at a central service or locally projected in a peer to peer network. Now Alex is equipped to leave home and appear, to other users having similar technology, as wearing the purchased shoes.

Bailey, for example, may plan to meet Alex for lunch. Upon Bailey's arrival at the restaurant, for example, Alex may already be present. Bailey's mobile device, which may be in proximity of Alex's mobile device, can receive (e.g., through NFC or other proximate communication protocol) one or more descriptors, unique IDs, or other information corresponding to aesthetic attributes associated with (and projected by) Alex. For each of the unique IDs, Bailey's mobile device can look up either locally or query a service for the information needed to render the appropriate aesthetic according to the specifications of the mobile device, e.g., to match Alex's virtual outfit. Using Bailey's mobile device which displays the updated video stream, Bailey can see (virtually) Alex's outfit, including the shoes.

In some implementations, queries to the web can be based on the characteristics and capabilities of a given computer device. For example, if Bailey's mobile device is an older model, the queries may retrieve lower detailed and/or less resource-intensive data. When Bailey eventually upgrades to a higher-capability mobile device, for example, the same unique IDs can be used to retrieve higher quality versions.

In some implementations, the system can be used as a front end for completing an online purchase of a physical product that matches an object that is updated in the updated video stream. For example, Alex's mobile device can also obtain information from the web based on the unique ID. If Bailey compliments Alex on the shoes, Alex can complete an online order for the shoes, e.g., using the unique ID and a product identifier and other information associated with the shoes.

FIG. 4 is a flowchart of an example process 400 for specifying aesthetic attributes for augmenting, altering, or otherwise changing content on a user's own device. For example, a user can elect to augment the presentation of designs seen through the user's own device, e.g., that include the user. In some implementations, the system 100 can perform steps of the process 400 using instructions that are executed by one or more processors. FIG. 1 is used to provide example structures for performing the steps of the process 400.

At a first device, a first user selection is received of a preference for one or more aesthetic attributes to be associated with the first user and the one or more aesthetic attributes are stored (402). For example, using the computer device 106 and an interface to the video stream updating module 111, the user 101 (e.g., Alice) can input preferences as to how images containing Alice are to appear on Alice's own computer device 106, such as to show Alice wearing designer clothes. The preference can be stored, e.g., as user preferences 138.

An image is captured (404). For example, Alice can use her computer device 106 (e.g., a camera-equipped smart phone) to take a photo of herself.

The preferences are evaluated (406). For example, the video stream updating module 111 can evaluate Alice's preference to be shown wearing designer clothes.

The image is selectively augmented, altered or otherwise changed using the one or more aesthetic attributes, and the image data is presented on the first device (408). The substitution engine 115, for example, can substitute objects in a video stream, e.g., including a dress or slacks that Alice is wearing, to show Alice as wearing the designer clothes.

In some implementations, the one or more aesthetic attributes can be attributes associated with clothes the first user is wearing, the image data can be an image of the first user as viewed by the first device, and augmenting the image can include superimposing over or embellishing on clothes worn by the first user such that the aesthetic attributes appear to be worn by the first user. For example, the video stream updating module 111 can change a video stream 108, to make Alice appear to be wearing designer clothes, as described above. Changing the video stream 108, for example, can include superimposing pre-determined images of designer clothes onto the image or Alice, or modifying the image in some other way, such as by filling in regions of the image with colors and/or patterns that resemble or approximate designer patterns.

In some implementations, the one or more aesthetic attributes can constitute an outfit, appearance, persona or look that the first user has opted to project, and augmenting the image data includes augmenting the image of the first user to apply the outfit, appearance, persona or look to the first user when viewed through the first device. For example, the aesthetic attributes 140 specified by Alice can be clothing-related, appearance-related (e.g., to make Alice look taller), or emotion-related (e.g., to make Alice look happy, intelligent, or have other qualities). The substitution engine 115, for example, can change the image of Alice to project the outfit, appearance, or look specified by Alice.

In some implementations, identifying image data can include capturing image data associated with the first user using a camera included in the first device, and augmenting the image data can include augmenting a captured image. As an example, the computer device 106 can be a camera-equipped mobile device. Upon capturing an image of Alice, the example, the camera can display an augmented image of Alice, according to the one or more aesthetic attributes.

In some implementations, the process 400 can further include capturing an image of a scene that includes the first user, recognizing the first user in the captured image, and augmenting a portion of the captured image that includes the first user to apply an outfit to the first user. The video stream updating module 111 can use image recognition techniques to determine that the image includes Alice. The video stream updating module 111 can then augment the image of Alice, e.g., using the one or more aesthetic attributes.

In some implementations, the process 400 can further include receiving, at the first device, one or more additional projected aesthetic attributes associated with other users, recognizing one of the other users in the captured image, and augmenting a portion of the captured image that includes the one other user based on respective received projected attributes for the one other user. For example, Alice can also specify one or more aesthetic attributes that are to be applied to other people in addition to herself. When Alice takes a photo that includes the other people, for example, the one or more aesthetic attributes can be applied to the images of the other people by, for example, the video stream updating module 111.

In some implementations, selectively augmenting can include selectively controlling when to augment image data including augmenting the image data when a control has been selected by a second user associated with the first device to enable augmentation and further disabling augmentation when the control has been disabled. For example, a control accessible on Alice's computer device 106 (or anyone else's), when selected, can indicate that images are not augmented.

Figure 5:
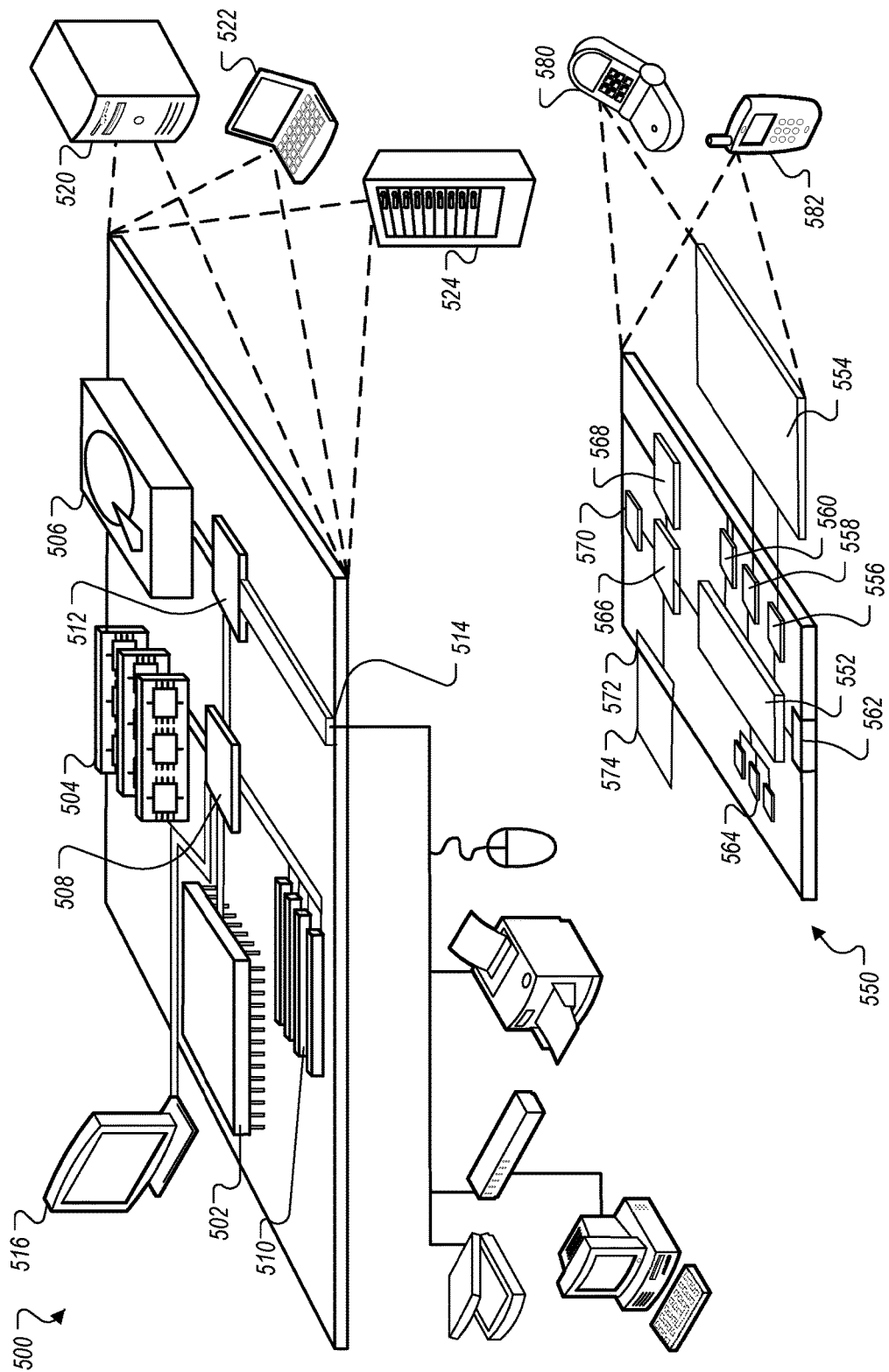
FIG. 5 is a block diagram of an example computer system that can be used to implement the methods, systems and processes described in this disclosure.

FIG. 5 is a block diagram of example computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 500 is further intended to represent any other typically non-mobile devices, such as televisions or other electronic devices with one or more processors embedded therein or attached thereto. Computing device 550 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 500 includes a processor 502, memory 504, a storage device 506, a high-speed controller 508 connecting to memory 504 and high-speed expansion ports 510, and a low-speed controller 512 connecting to low-speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed controller 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low-speed controller 512 manages lower bandwidth-intensive operations. Such allocation of duties is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed bus 514. The low-speed bus 514 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as computing device 550. Each of such devices may contain one or more of computing devices 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The computing device 550 may also be provided with a storage device, such as a micro-drive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the computing device 550, such as control of user interfaces, applications run by computing device 550, and wireless communication by computing device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of computing device 550 with other devices. External interface 562 may provide, for example, for wired communication (e.g., via a docking procedure) or for wireless communication (e.g., via Bluetooth® or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to computing device 550 through expansion interface 572, which may include, for example, a subscriber identification module (SIM) card interface. Such expansion memory 574 may provide extra storage space for computing device 550, or may also store applications or other information for computing device 550. Specifically, expansion memory 574 may include instructions to carry out or supplement the processes described above, and may include secure information also. Thus, for example, expansion memory 574 may be provide as a security module for computing device 550, and may be programmed with instructions that permit secure use of computing device 550. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Computing device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 568 (e.g., a radio-frequency transceiver). In addition, short-range communication may occur, such as using a Bluetooth®, WiFi, or other such transceiver (not shown). In addition, GPS receiver module 570 may provide additional wireless data to computing device 550, which may be used as appropriate by applications running on computing device 550.

Computing device 550 may also communicate audibly using audio codec 560, which may receive spoken information from a user and convert it to usable digital information. Audio codec 560 may likewise generate audible sound for a user, such as through a speaker, e.g., in a handset of computing device 550. Such sound may include sound from voice telephone calls, may include recorded sound (e.g., voice messages, music files, etc.) and may also include sound generated by applications operating on computing device 550.

The computing device 550 may be implemented in a number of different forms, as shown in the figure. For example, it may be implemented as a cellular telephone 580. It may also be implemented as part of a smartphone 582, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    at a first device, receiving a first user selection of a preference for one or more aesthetic attributes to be associated with the first user and to be projected to a second user capable of viewing either the first user or an object associated with the first user, and storing the preference for the one or more aesthetic attributes;
    capturing an image of the first user;
    evaluating the preference;
    selectively augmenting the image of the first user using the one or more aesthetic attributes and presenting, on the first device, image data that is augmented by the one or more aesthetic attributes;
    receiving, at a second different device not associated with the first user, the preference for the one or more aesthetic attributes;
    identifying, at the second different device, image data associated with the first user and selectively augmenting the identified image data using the one or more aesthetic attributes; and
    presenting, on the second different device, the identified image data that is augmented by the one or more aesthetic attributes.

2. The computer-implemented method of claim 1 wherein the one or more aesthetic attributes are attributes associated with clothes the first user is wearing, wherein the identified image data is an image of the first user as viewed by the second different device, and wherein augmenting the identified image data includes superimposing over or embellishing on clothes worn by the first user such that the one or more aesthetic attributes appear to be worn by the first user.

3. The computer-implemented method of claim 2 wherein the one or more aesthetic attributes constitute an outfit, appearance, or look that the first user has opted to project, and wherein augmenting the identified image data includes augmenting the identified image data associated with the first user to apply the outfit, appearance or look to the first user when viewed through the second different device.

4. The computer-implemented method of claim 1 wherein identifying image data includes capturing image data associated with the first user using a camera included in the second different device, and wherein augmenting the identified image data includes augmenting a captured image.

5. The computer-implemented method of claim 1 further comprising capturing an image of a scene that includes the first user, recognizing the first user in the captured scene, and augmenting a portion of the image of the captured scene that includes the first user to apply an outfit to the first user.

6. The computer-implemented method of claim 5 further comprising receiving at the second different device one or more additional aesthetic attributes associated with other users, recognizing one of the other users in the captured scene, and augmenting a portion of the image of the captured scene that includes the one other user based on the one or more additional aesthetic attributes for the one other user.

7. The computer-implemented method of claim 1 wherein selectively augmenting includes selectively controlling when to augment the identified image data including augmenting the identified image data when a control has been selected by the second user associated with the second different device to enable augmentation and further disabling augmentation when the control has been disabled.

8. The computer-implemented method of claim 1, wherein the preference for the one or more aesthetic attributes includes an object identifier, and augmenting the identified image data includes augmenting the identified image data using the object identifier to access a fully encapsulated representation to use in the augmenting.

9. The computer-implemented method of claim 8, wherein using the object identifier to access a fully encapsulated representation to use in the augmenting comprises:
    transmitting the object identifier from device to device or through a central service; and
    receiving one of at least two versions of the fully encapsulated representation based on a capability of the second different device.

10. A system comprising:
    one or more processors; and
    one or more memory devices including instructions that, when executed, cause the one or more processors to perform operations comprising
        receiving and storing, at a first device, a first user selection of a preference for one or more aesthetic attributes to be associated with the first user and to be projected to a second user capable of viewing either the first user or an object associated with the first user,
        capturing an image of the first user,
        evaluating the preference,
        selectively augmenting the image of the first user using the one or more aesthetic attributes and presenting, on the first device, image data that is augmented by the one or more aesthetic attributes,
        receiving, at a second different device not associated with the first user, the preference for the one or more aesthetic attributes,
        identifying, at the second different device, image data associated with the first user and selectively augmenting the identified image data using the one or more aesthetic attributes, and
        presenting, on the second different device, the identified image data that is augmented by the one or more aesthetic attributes.

11. The system of claim 10 wherein the preference for the one or more aesthetic attributes includes an object identifier, and
    augmenting the identified image data includes augmenting the identified image data using the object identifier to access a fully encapsulated representation to use in the augmenting.

12. The system of claim 11 wherein using the object identifier to access a fully encapsulated representation to use in the augmenting comprises:
    transmitting the object identifier from device to device or through a central service; and
    receiving one of at least two versions of the fully encapsulated representation based on a capability of the second different device.

13. A non-transitory computer-readable medium storing instructions, that when executed, cause one or more processors to perform operations comprising:
- receiving and storing, at a first device, a first user selection of a preference for one or more aesthetic attributes to be associated with the first user and to be projected to a second user capable of viewing either the first user or an object associated with the first user;
- capturing an image of the first user;
- evaluating the preference;
- selectively augmenting the image of the first user using the one or more aesthetic attributes and presenting, on the first device, image data that is augmented by the one or more aesthetic attributes;
- receiving, at a second different device not associated with the first user, the preference for the one or more aesthetic attributes;
- identifying, at the second different device, image data associated with the first user and selectively augmenting the identified image data using the one or more aesthetic attributes; and
- presenting, on the second different device, the identified image data that is augmented by the one or more aesthetic attributes.

14. The non-transitory computer-readable medium of claim 13 wherein the one or more aesthetic attributes are attributes associated with clothes the first user is wearing, wherein the identified image data is an image of the first user as viewed by the second different device, and wherein augmenting the identified image data includes superimposing over or embellishing on clothes worn by the first user such that the one or more aesthetic attributes appear to be worn by the first user.

15. The non-transitory computer-readable medium of claim 14 wherein the one or more aesthetic attributes constitute an outfit, appearance, or look that the first user has opted to project, and wherein augmenting the identified image data includes augmenting the identified image data associated with the first user to apply the outfit, appearance or look to the first user when viewed through the second different device.

16. The non-transitory computer-readable medium of claim 13 wherein identifying image data includes capturing image data associated with the first user using a camera included in the second different device, and wherein augmenting the identified image data includes augmenting the captured image data using outfits data obtained by the second different device from a digital catalog for outfits for an online purchase system.

17. The non-transitory computer-readable medium of claim 16, wherein the preference for the one or more aesthetic attributes includes an object identifier for an outfit, and augmenting the identified image data includes augmenting the captured image data using the object identifier to access a fully encapsulated representation to use in the augmenting.

18. The non-transitory computer-readable medium of claim 17, wherein using the object identifier to access a fully encapsulated representation to use in the augmenting comprises:
- transmitting the object identifier from device to device or through a central service; and
- receiving one of at least two versions of the fully encapsulated representation based on a capability of the first device.

19. The non-transitory computer-readable medium of claim 13 wherein the operations further comprise capturing an image of a scene that includes the first user, recognizing the first user in the captured image of the scene, and augmenting a portion of the captured image of the scene that includes the first user to apply an outfit to the first user.

20. The non-transitory computer-readable medium of claim 19 wherein the operations further comprise receiving, at the second different device, one or more additional aesthetic attributes associated with other users, recognizing one of the other users in the captured image of the scene, and augmenting a portion of the captured image of the scene that includes the one other user based on the one or more additional aesthetic attributes for the one other user.

* * * * *